United States Patent [19]

Yamasaki et al.

[11] Patent Number: 5,067,031
[45] Date of Patent: Nov. 19, 1991

[54] METHOD AND APPARATUS FOR PROCESSING VIDEO SIGNALS RECORDED ON OR RECOVERED FROM MAGNETIC MEDIA

[75] Inventors: Tatsuo Yamasaki; Toshifumi Fujii, both of Kyoto, Japan

[73] Assignee: Mitsubishi Denki Kabushiki Kaisha, Tokyo, Japan

[21] Appl. No.: 489,877

[22] Filed: Mar. 6, 1990

Related U.S. Application Data

[63] Continuation of Ser. No. 113,883, Oct. 27, 1987, abandoned.

[30] Foreign Application Priority Data

Oct. 28, 1986 [JP] Japan .................. 61-257406
Nov. 19, 1986 [JP] Japan .................. 61-275689

[51] Int. Cl.$^5$ .................. G11B 5/02; H04N 5/78
[52] U.S. Cl. .................. 360/22; 360/33.1; 360/38.1; 360/64; 358/335
[58] Field of Search .................. 360/22, 23, 33.1, 38.1, 360/32, 8, 64; 358/310, 314, 327, 335, 336, 347

[56] References Cited

U.S. PATENT DOCUMENTS

| | | | |
|---|---|---|---|
| 4,021,852 | 5/1977 | Hurst et al. | 358/336 |
| 4,224,481 | 9/1980 | Russell | 358/347 X |
| 4,480,272 | 10/1984 | Horstmann | 360/8 |
| 4,489,354 | 12/1984 | Dann | 360/64 |
| 4,509,083 | 4/1985 | Nakano | 360/19.1 X |
| 4,668,985 | 5/1987 | Kurashige et al. | 360/22 X |
| 4,672,467 | 6/1987 | Heitmann | 358/314 |
| 4,686,582 | 8/1987 | Lovely | 358/310 |
| 4,739,419 | 4/1988 | Schauffele | 358/310 X |
| 4,746,996 | 5/1988 | Furuhata et al. | 360/36.2 |
| 4,752,839 | 6/1988 | Lovely | 358/310 X |
| 4,752,840 | 6/1988 | Luso et al. | 360/22 |
| 4,766,505 | 8/1988 | Nakano et al. | 360/32 X |
| 4,809,097 | 2/1989 | Fujii et al. | 360/22 X |

OTHER PUBLICATIONS

IEEE Transactions on Consumer Electronics, vol. CE-32, No. 2, May 1986, pp. 107-115, "A High Definition Muse VCR with Analog Segment Recording Method", Furuhata et al.

Primary Examiner—Aristotelis Psitos
Assistant Examiner—Andrew L. Sniezek
Attorney, Agent, or Firm—Wolf, Greenfield & Sacks

[57] ABSTRACT

The specification discloses a recording and reproducing apparatus for dividing a video signal of one field into a plurality of segments and recording the video signal onto a plurality of tracks on a recording mediuim. By the recording and reproducing apparatus, an additional period is inserted between the adjoining segments. Further, the signal included in one of the adjoining segments is used as a signal of the additional period.

3 Claims, 5 Drawing Sheets

Fig. 1

(PRIOR ART)

METHOD AND APPARATUS FOR PROCESSING VIDEO SIGNALS RECORDED ON OR RECOVERED FROM MAGNETIC MEDIA

FIELD OF THE INVENTION

The present invention relates generally to an and reproducing the signals from the record on the medium and more particularly to a recording and reproducing apparatus for dividing a video signal of one field into a plurality of "segments" and recording the video signal onto a plurality of tracks on a recording medium by use of rotary heads provided therewith.

DESCRIPTION OF THE PRIOR ART

As a method of recording by use of a magnetic recording and reproducing apparatus (hereunder referred to simply as a VTR) a signal of a wide band (hereunder referred to as a wide-band video signal) such as a high vision signal, (that is, a high definition television signal) in which the band width of the luminance signal is 20 MHz and whose band is wider than that of the existing video signal including the NTSC signal, there has been performed what is called a "segment recording" method for dividing a video signal of one field into a plurality of segments and recording the video signal onto a plurality of tracks on a recording medium.

FIG. 1(a) shows one field period $T_y$ of the foregoing wide-band video signal. In case of effecting the "segment recording" method of such a signal by the VTR without changing its format, the heads are switched while the video signal of one field is being reproduced. However, when the heads are switched, a discontinuity (called skew) of the reproduced signal on the time base occurs due to the expansion and contraction of a magnetic tape. To prevent this, there is a method whereby the skew is corrected by switching the heads within the horizontal blanking period of the video signal. However, when considering the compatible reproduction or the like, the amount of the skew often reaches that corresponds to about a few μsec. Therefore, the skew cannot be completely corrected within the horizontal blanking period of the video signal which is generally set to a short period.

Therefore, the wide-band video signal is not recorded in segments without changing its format but an additional period longer than the skew amount is provided at the head switching position. A practical example is shown in FIG. 1(b). FIG. 1(b) shows the case of the two-segment recording in which the video signal of one field is recorded onto two tracks on a recording medium. In the wide-band video signal shown in FIG. 1(a) as the original signal, a vertical blanking period VB which does not appear on the TV screen is reduced. An additional period $T_O$ corresponding to only the reduced period is provided in the joint portions of respective segments S1 and S2 which are obtained by dividing one field into two sections. The heads are switched at the positions indicated by arrows AR in the portion near almost the middle position of the additional period $T_O$ and in the non-signal portion of the reduced vertical blanking period. Due to this, the video information is not dropped out since he period $T_O$ is longer than the skew amount. On the other hand, by removing such an additional period $T_O$ by the process (not shown) upon reproduction of the video signal, the wide-band video signal with the original format can be recovered. The additional period $T_O$ is inserted in such a manner to be located in the overlap interval of each recording track.

As mentioned above, the additional period $T_O$ which was interposed between the segments upon recording is of the video signal removed upon reproduction of the video signal and does not appear on the TV screen. Therefore, in the conventional VTR, a simple format such as a constant level signal or the like as shown in FIG. 1(b) is used as a signal of each additional period $T_O$.

In the process such that what is called a "mixed signal" is transmitted to the frequency modulator (not shown) at the next stage in order to record the "mixed signal" in the above described manner after the additional period $T_O$ was inserted by reducing the vertical blanking period of the original signal, if a coupling capacitor is used, the DC component is lost. To obviate this, there is a method whereby the DC level of the "mixed signal" is aligned by performing the clamping process and thereafter the signal is transmitted to the frequency modulator or the like. However, even in the case of aligning the DC level of the "mixed signal" by the clamping in this transmitting method, it is difficult to transmit with a high fidelity the signal of the low frequency component which is represented by the DC component signal under characteristics (for example, a response characteristic) of the clamping circuit. When the signal in each additional period $T_O$ of the "mixed signal" is set to the DC component of the black level as shown in FIG. 1(b), a phenomenon called a "sag" such that the flat portion of the signal being inclined occurs in the additional period $T_O$. Therefore, a sag also happens in the video signal of each segment just after the additional period $T_O$ due to the influence of the signal in the additional period $T_O$ in which the sag occurs. In the video signal of each segment, the DC component is deviated from the inherent position, such a "mixed signal" inputted to the frequency modulator and further the modulated signal is recorded by the VTR.

On the other hand, even in the case where the "mixed signal" is transmitted to the frequency modulator by directly coupling without using a coupling capacitor, it is hard to transmit the DC component with a high-fidelity. Therefore, the signal portion in the additional period $T_O$ which was set at the black level in the "mixed signal" is set at the signal level which was deviated from the inherent black level. The format of the inherent "mixed signal" cannot be recorded by the VTR with a high fidelity.

On the other hand, even in the reproducing process (not shown) for recovering the original wide-band video signal by eliminating the additional period inserted upon recording of the original signal, the clamping process is performed. However, so long as the response characteristic or the like of the clamping circuit is not perfect, the sag which occurred upon recording of the video signal cannot be completely eliminated upon reproduction of the video signal.

As described above, in the "mixed signal", the signal in the additional period (which was set in the joint portion between the respective segments obtained by dividing the video signal of one field) is set into the DC component signal such as a black level or the like. Such a "mixed signal" is used upon recording of the video signal so that a sag easily occurs in the transmitting step of the "mixed signal". The video signal level which being different from the inherent signal level is recorded by the VTR. The sag remains and appears in the wide-band video signal which was recovered by eliminating the additional period so long as the characteristic of the clamping circuit executed upon reproduction of the video signal is not perfect. Thus, there is a problem such that this sag is displayed as a visible image on the television screen, or the like.

Further, the portion near the arrow AR in FIG. 1(b) is recorded at the edge of the track which is formed on the recording of medium such as the magnetic tape. Although the contact state of the head with the recording medium, what is called a "head touch" is generally stable at the center of the track, it is likely to be unstable at the edge.

As above stated, the recording signal in the conventional VTR of the "segment recording" system is as shown in FIG. 1(b). Therefore, it is necessary to correct the deterioration in picture quality in the joint portion of the segments which is caused due to the defective "head touch" at the edge of the track upon reproduction of the video signal. As the corrective means, it is considered to replace the portion of the deteriorated picture quality with the signal of the different scanning lines by use of a dropout corrective circuit. However, this correcting system has a problem such that it is insufficient as a countermeasure for the defective "head touch".

The present invention is made to solve the foregoing problems and it is accordingly an object of the invention to provide a recording and reproducing apparatus in which even if an additional period is provided between the segments, a sag hardly occurs in the "mixed signal".

It is another object of the invention to provide a recording and reproducing apparatus in which even when the head defectively comes into contact with the storage medium produced.

SUMMARY OF THE INVENTION

According to a recording and reproducing apparatus of the present invention, as a signal in an additional period provided in the joint portion between respective segments which are obtained by dividing one field into a plurality of segments in order to perform the "segment recording", a mixed signal is formed so as to directly and subsequently use the signal of the last one line included in the segment located immediately before the additional period (or that of the first one line included in the segment located directly after the additional period), and the occurrence of the sag in the transmitting process of the "mixed signal" upon recording of the video signal is reduced as little as possible.

In the apparatus of the present invention, since the signal in the additional period is formed by continuing the signal of the last one line of the preceding segment immediately before the additional period, when the mixed signal upon recording of the video signal is transmitted, a sag hardly occurs in the video signal of the segment just after the additional period.

According to a recording and reproducing apparatus of the present invention, in the apparatus for dividing the video signal of one field into a plurality of segments and recording the segments on a recording medium, an additional period is provided between the respective segments. Further, the signals of the first P (P is a natural number) lines of the next segment are interposed and recorded onto a recording medium corresponding to the former half portion in the additional period, while the signals of the last Q (Q is a natural number) lines of the preceding segment are interposed and recorded onto the medium corresponding to the latter half portion.

When a defective "head touch" occurs at one edge of a track upon reproduction of the video signal, the signals of the (P+Q) lines interposed within the additional period are used to correct the reproduced signal in the portion where the defective "head touch" occurs.

As described above, according to the invention, in the apparatus for recording one field onto a plurality of tracks, as the signal in the additional period provided in the joint portion between the respective segments which are obtained by dividing the video signal of one field into a plurality of segments, the signal of the last one line in the segment located immediately before the additional period (or of the first line in the segment located directly after the additional period) is used. Therefore, when the mixed signal is transmitted after the additional period was inserted, an increase in sag due to the insertion of the additional period does not occur. The DC component can be recorded by the VTR with a high fidelity.

Furthermore, as mentioned above, according to the invention, in the VTR for dividing the video signal of one field into a plurality of segments and recording the segments on a recording medium, an additional period is provided between the respective segments and the signals immediately before and after the additional period are interposed and recorded in the additional period. Therefore, even if the defective "head touch" occurs at one edge of the track and the reproduced signal was dropped out upon reproduction of the video signal, it can be corrected by use of the reproduced signal of the portion of the additional period. There is an effect such that the good reproduced images can be obtained.

BRIEF DESCRIPTION OF THE DRAWINGS

Other objects and features of the present invention will be apparent to those skilled in the art on consideration of the following description taken in connection with the accompanying drawings wherein like parts in each of the several figures are designated by the same reference numeral and wherein:

FIGS. 1(a) and (b) are time charts for illustrating the operation of a conventional apparatus;

FIGS. 3(a), (b), (c) and (d) are time charts for illustrating the operation of the embodiment of FIG. 2;

DESCRIPTION OF THE PREFERRED EMBODIMENTS

An embodiment of the present invention will be described hereinbelow with reference to FIGS. 2 and 3. In this case, an explanation will be made with respect to the example of the rotary two-head helical scan type VTR of the two-segment recording type in which the video signal of one field is recorded onto two tracks.

Figure 2:
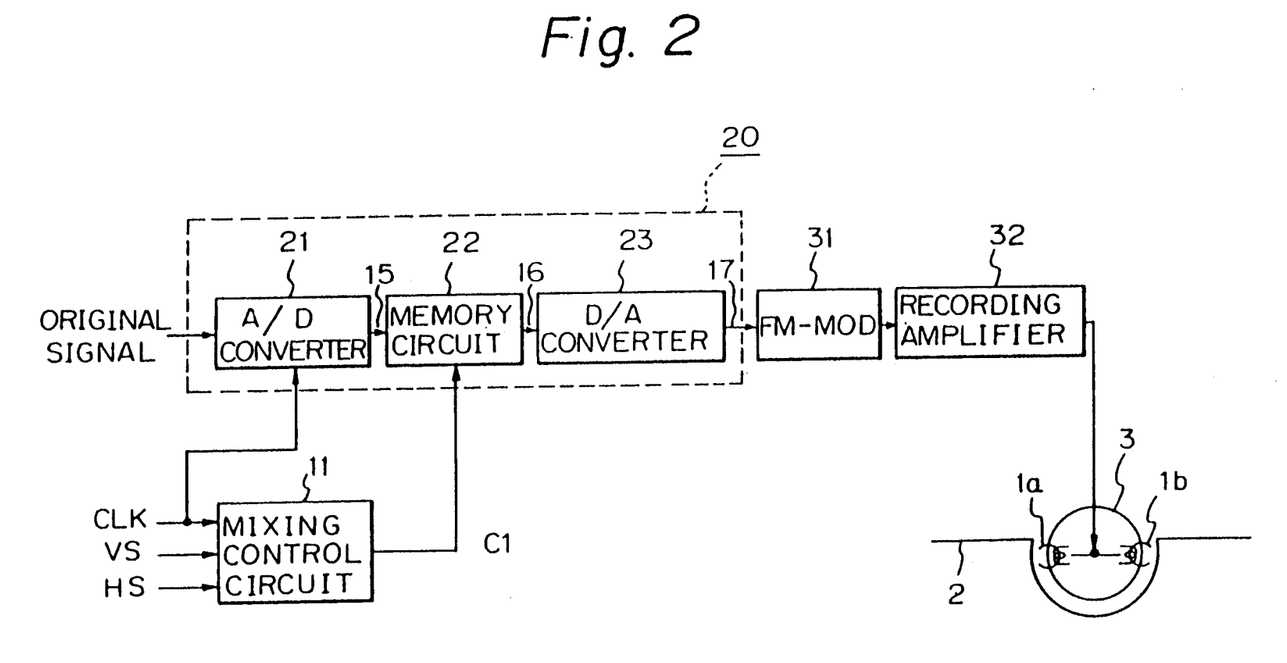
FIG. 2 is a block diagram showing structure of a recording portion of a recording and reproducing apparatus embodying the present invention.
Figure 3:
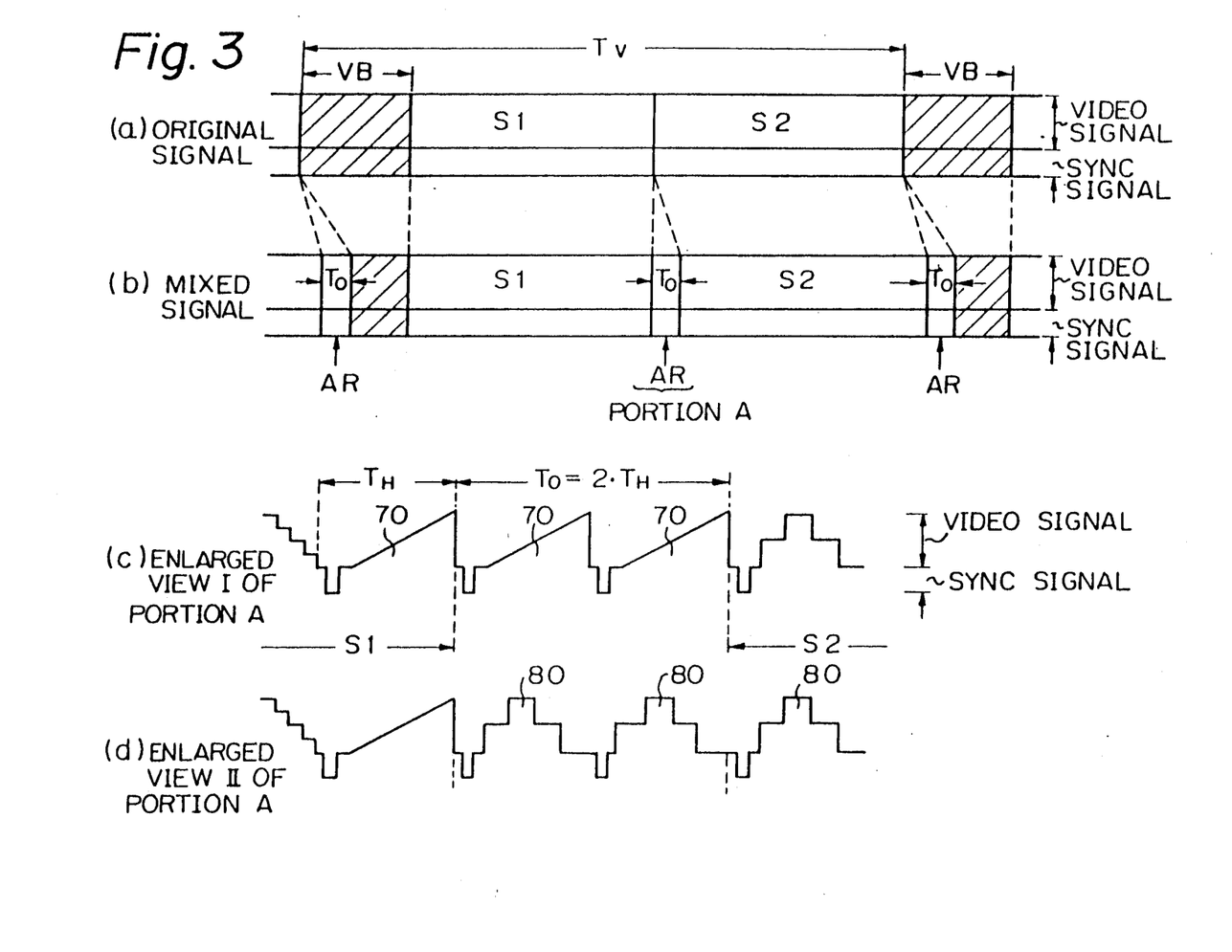

FIG. 2 is a block diagram showing structure of a recording portion of a recording and reproducing apparatus embodying the present invention. In the diagram, reference numeral 11 and 20 denote a mixing control circuit and a mixing circuit, respectively. A vertical sync signal VS of a field period $T_v$ (not shown), a horizontal sync signal HS of one horizontal scanning period $T_H$, and a clock signal CLK whose phase is locked with that of the sync signals of the original signal which were separated from the wide-band video signal as the original signal are input to the mixing control circuit 11. The mixing circuit 20 comprises an A/D converter 21, a memory circuit 22, and a D/A converter 23. The wide-band video signal as the original signal and the clock signal CLK are input to the A/D converter 21 Digital data 15, which is obtained by sampling and digitizing the original signal, is inputted to the memory circuit 22.

A write/read control signal $C_1$, which is inputted from the mixing control circuit 11 to the memory circuit 22, is a signal to control the writing or reading operation in the memory circuit 22 with respect to the digital data 15 or the like regarding the original signal. In the case of reading from the memory circuit 22, the video signal of the last one line having one horizontal scanning period $T_H$ of the segment located directly before the additional period in the additional period which is provided in the joint portion between the respective segments which are obtained by dividing one field into two segments is subsequently repeatedly read out and is used as the signal in the additional period. It is sufficient that the additional period is set to be longer than the amount of skew which occurs. The additional period is not limited to the period which is integer times as long as one horizontal scanning period $T_H$. Readout data 16 which was read out of the memory circuit 22 is input to the D/A converter 23. The digital data is converted into the analog signal, so that a "mixed signal" 17 is derived.

Figure 1:
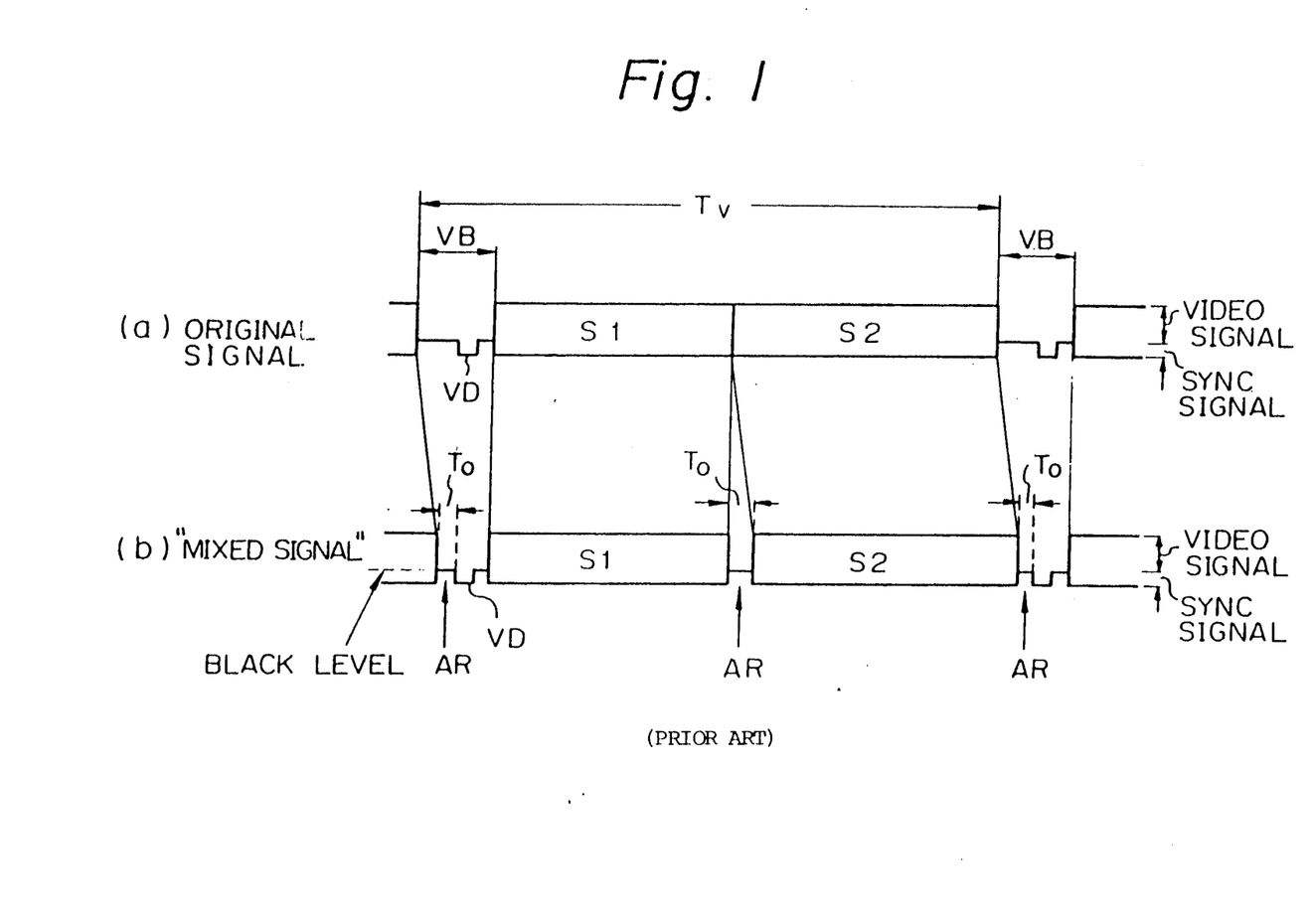

FIGS. 3(a) and (b) respectively show the original signal and the mixed signal which have been described in FIG. 1. FIG. 3(a) is a diagram showing the wide-band video signal as the original signal for one field period $T_v$. FIG. 3(b) shows the mixed signal 17 which is output from the D/A converter 23 and shows the additional period $T_O$ provided in the joint portion between the respective segments by controlling the writing or reading operation of the memory circuit 22 and reducing the vertical blanking period VB in the original signal of FIG. 3(a). FIGS. 3(c) and (d) are enlarged diagrams of the portion of the additional period $T_O$ indicated by the portion A in FIG. 3(b). In these diagrams, the example in the case where the additional period $T_O = 2 \times T_H$ is shown. In the additional period $T_O$ shown in FIG. 3(c), after a video signal 70 of the last one line of the preceding segment S1 is directly repeated for the period of two lines, the video signal of the next segment S2 follows. On the other hand, in the additional period $T_O$ shown in FIG. 3(d), a video signal 80 of the first line of the next segment S2 is repeated for the period of two lines directly after the video signal of the last one line of the preceding segment S1.

After the mixed signal 17 was transmitted to a frequency modulator 31 and modulated in to the FM signal, it is recorded through a recording amplifier 32 onto a magnetic tape 2 from magnetic heads 1a and 1b attached to a rotary cylinder 3 in such a manner that the heads face each other at a distance of an angle of 180°. Further, the heads are switched at the position indicated by an arrow (AR) which is almost the middle position in each additional period $T_O$ in the mixed signal shown in FIG. 3(b). Further, since each additional period $T_O$ is recorded in the overlap interval on each recording track on the magnetic tape, the video signal is not dropped out. Therefore, although not shown, by eliminating each additional period upon reproduction of the video signal, the wide-band video signal can be recovered without dropping out any video signal.

As described above, in the mixed signal 17 which is transmitted to the frequency modulator 31, as shown in FIG. 3(c) or (d), the signal of the last one line in the segment located immediately before the additional period (or of the first one line in the segment located directly after the additional period) is repeatedly used as the signal in the additional period. Therefore, in the process to transmit the mixed signal, even in the case where the mixed signal is transmitted by directly coupling without using a coupling capacitor, and in the case where after a coupling capacitor was used, the clamping process is performed to make the DC level of the mixed signal constant, then the signal is transmitted, or the like a sag hardly occurs in the video signal in the segment just after the additional period of the mixed signal. The DC component can be recorded by the VTR with a high fidelity. Therefore, in the process upon reproduction of the video signal, even if the characteristic such as a clamping characteristic or the like is improper so that the DC component cannot be sufficiently transmitted, a sag hardly occurs in the reproduced wide-band video signal which was recovered by eliminating the additional periods.

In the foregoing embodiment, as shown in FIG. 2, the sync signal of the wide-band video signal or original signal is what is called a negative polarity sync signal of the polarity opposite to that of the video signal. The negative polarity sync signal of the original signal is directly used even in the mixed signal which is outputted from the mixing circuit 20 in FIG. 2. However, in the mixing circuit 20, the negative polarity sync signal may be replaced by the signal of the format suitable for recording by the VTR and the signal of the last one line of the preceding segment located directly before the additional period (or of the first one line of the segment located directly after the additional period) having the replaced negative polarity sync signal may be also used as the signal in the additional period.

On the other hand, as the video signal having what is called a positive polarity sync signal in which the sync signal has the same polarity as that of the video signal, there is MUSE signal or the like which has been described in detail, for example, in the monthly report (published on July, 1984) by NHK Technical Institute. When the video signal having such a positive polarity sync signal is given as the original signal, an effect similar to that in the foregoing embodiment is obtained even by adding the negative polarity sync signal suitable for recording by the VTR in the mixing circuit 20 and by using the signal of the last one line of the preceding segment directly before the additional period (or that of the first one line of the segment immediately after the additional period), having the negative polarity sync signal added as the signal in the additional period.

Further, even in the case where the original signal which is input to the mixing circuit 20 is the video signal having no sync signal although it has the horizontal blanking period and the video information such as luminance signal, chrominance signals and so on of the components, an effect similar to that in the foregoing embodiment can be also derived by adding the negative polarity sync signal suitable for recording by the VTR in the mixing circuit 20 and by using the signal of the last on line in the preceding segment immediately before the additional period (or that of the first one line in the segment directly after the additional period) having the negative polarity sync signal added as the signal in the additional period.

Figure 4:
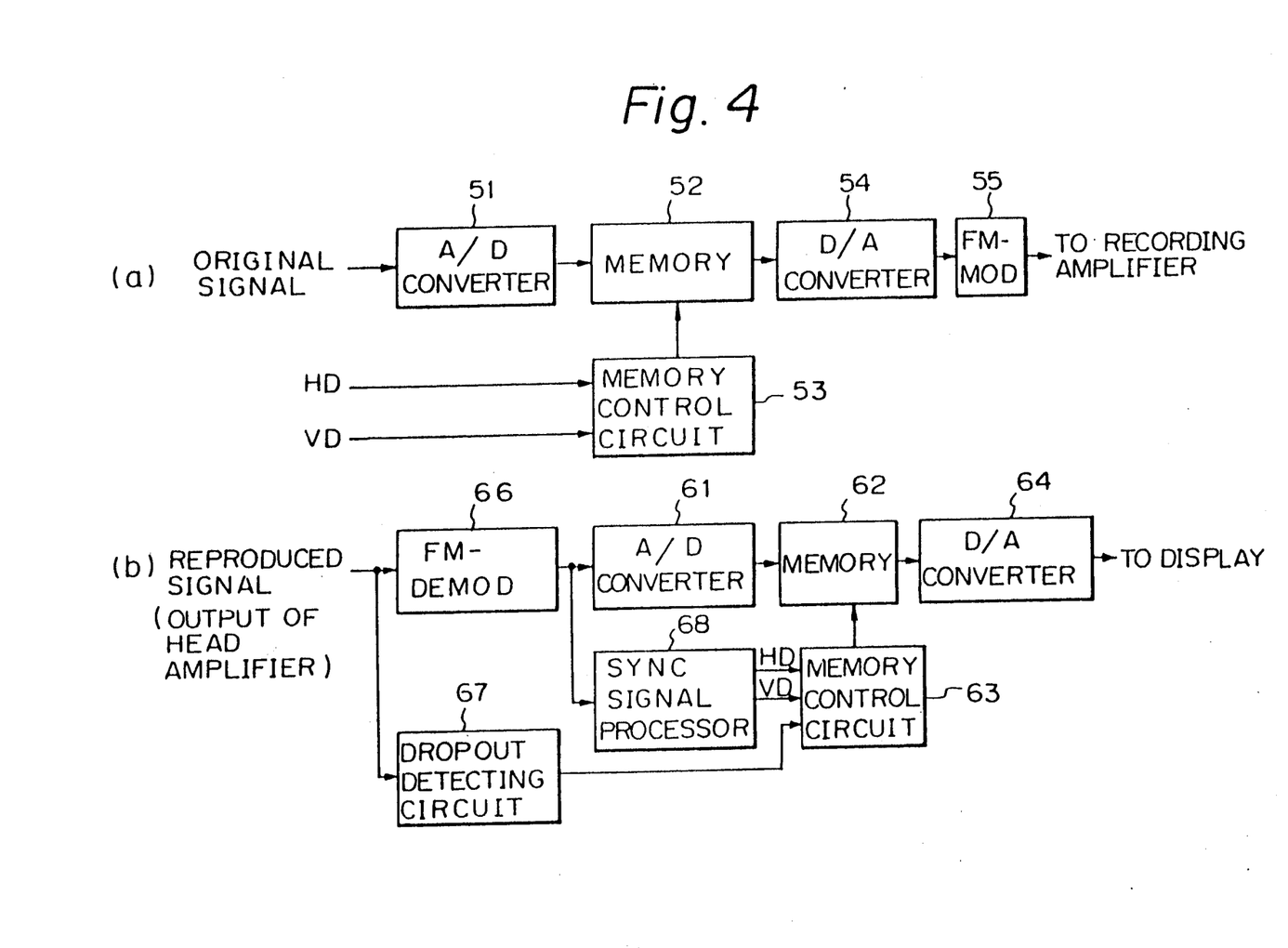
FIG. 4(a) is a block diagram showing structure of a recording portion of another embodiment of the present invention.
FIG. 4(b) is a block diagram showing structure of a reproducing portion of the embodiment of FIG. 4(a)
Figure 5:
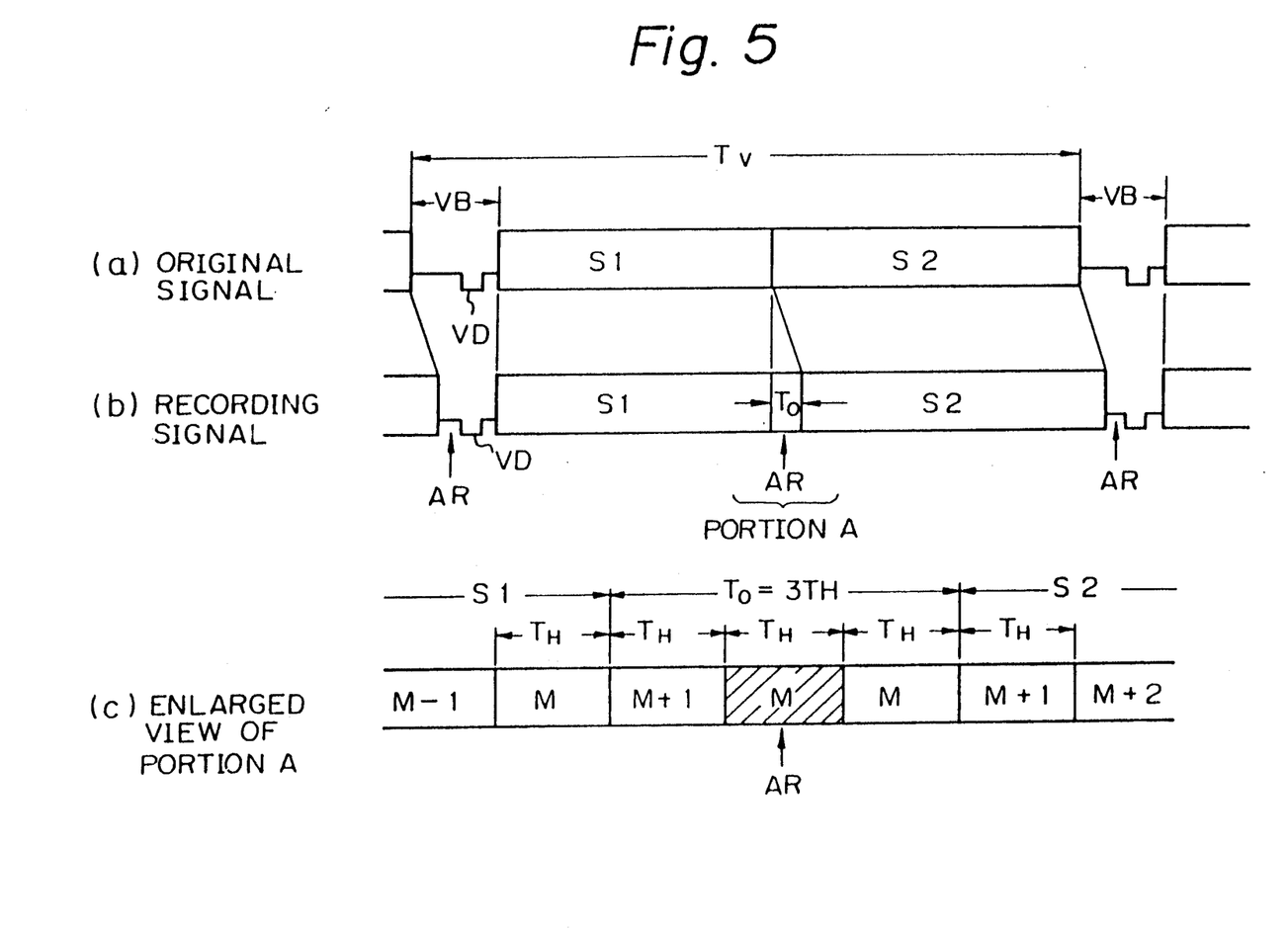
FIGS. 5(a) to (c) are time charts for illustrating the operation of the embodiment of FIGS. 4(a) and (b).

Another embodiment of the present invention will be described hereinbelow with reference to FIGS. 4 and 5. In this case, an explanation will be made with respect to the example of the rotary two-head VTR of the two-segment recording type in which the video signal of one field is recorded onto two tracks.

FIGS. 4(a) and 4(b) are block diagrams showing structure of a recording portion and that of a reproducing portion of the VTR embodying the present invention, respectively. In the diagram, reference numerals 51 and 61 denote A/D converters; 52 and 62 are memories; 53 a memory control circuit of the recording portion which circuit receives as an input signal a vertical sync signal VD in a field period $T_v$ (not shown) which was separated from a wideband video signal or original signal and a horizontal sync signal HD in a horizontal scanning period $T_H$; 54 and 64 D/A converters; and 55 a frequency modulator. Reference numeral 66 denotes a frequency demodulator; 67 is a dropout detecting circuit for receiving the reproduced signal, (that is, output of a head amplifier (not shown)) and detecting the occurrence of the dropout from its amplitude or period; 68 a sync signal processor for receiving an output of a frequency demodulator 66, for separating and detecting the vertical sync signal VD and the horizontal sync signal HD, and for generating a pseudo vertical sync signal VD and pseudo horizontal sync signal HD to compensate them when the vertical and horizontal sync signals VD and HD cannot be detected for a predetermined period; and 63 a memory control circuit of the reproducing portion for receiving outputs of the dropout detecting circuit 67 and sync signal processor 68 and for outputting a signal to control the memory 62. For brevity of drawing, a clock signal is omitted in FIGS. 4(a) and 4(b).

The operation of this embodiment will be described hereinbelow. The wide-band signal as the original signal shown in FIG. 5(a) is converted into the digital signal by the A/D converter 51 and written into the memory 52. In at least the operations which will be explained hereunder, the memory 52 consists of a plurality of "line memories" such that the write period and the read period do not coincide. FIG. 5(b) shows an output of the memory 52 as a format of an analog signal. This signal is converted into the analog signal by the D/A converter 54 and frequency modulated into the FM signal by the frequency modulator 55 and thereafter, it is recorded onto a magnetic tape. On the other hand, FIG. 5(c) is an enlarged diagram of the portion A in FIG. 5(b). The numbers M, M+1 . . . , etc. in the signal denote the scanning line numbers. As is obvious from FIGS. 5(b) and 5(c), the additional period T in this embodiment is equal to $3T_H$ ($T_H$ is a horizontal scanning period). The signals of the first line (The (M+1)th line) of the second segment S2 are interposed in the former half $T_H$ period in the $T_O$ period. The signals of the last line (the Mth line) of the first segment S1 are repeatedly interposed in the latter half $2T_H$ period. The foregoing signals are obtained in the read control from the memory 52 by continuously reading with respect to the first to (M+1)th lines and then after reading the Mth line twice, by again continuously reading from the (M+1)th line.

Upon reproduction of the video signal, the heads are switched at the positions shown by the arrows AR in FIGS. 5(b) and 5(c). When the heads are switched, the heads are located at the edges of the magnetic tape, that is, the edges of the track. As mentioned above, the defective "head touch" occurs in the edge portion of the track and the deterioration of the reproduced signal is liable to occur. Therefore, in this embodiment, the portion where the possibility of the occurrence of the deterioration of the reproduced signal is large, namely, the signals of the Mth and (M+1)th lines are reproduced twice. That is to say, the signals are reproduced at the upper and lower edges of the track by the different heads, respectively. Therefore, the reproduced signals of the last line (the Mth line) in the additional period $T_O$ are used in the case where the occurrence of the deterioration of the reproduced images is predicted due to the outputs of the dropout detecting circuit 67 and sync signal processor 68, such as in the cases where the dropout of the signal of a predetermined width or wider occurred upon reproduction of the last line (the Mth line) of the first segment, where the horizontal sync signal is not detected, and the like. Similarly, if the deterioration of the reproduced signals of the first line, (that is, the (M+1)th line) of the second segment is predicted, the reproduced signals of the first line, (that is, the (M+1)th line) in the additional period $T_O$ which has already been written in the memory 62 are used.

Thus, the same code is reproduced twice with regard to the signals of the Mth and (M+1)th lines so that, the other reproduced signals are used when the defective "head touch" occurred thereby enabling the reproduced images without deterioration to be obtained.

On the other hand, the signals having the correlation with the signals immediately before and after the additional period are interposed in the additional period in this embodiment. Therefore, the occurrence of the sag upon DC reproduction can be prevented. Namely, in the conventional apparatus, the signal at a constant level having no correlation with the signals immediately before and after the additional period has been interposed in the additional period. However, according to such a conventional system, upon DC reproduction, the signals are influenced by the signal in the additional period and the sag occurs. The embodiment is also effective to prevent the occurrence of the sag. Although the probability is low, when both of the signals which are reproduced twice have deteriorated, they are replaced with the signals of the different lines by the dropout correction in a manner similar to the conventional apparatus.

The foregoing embodiment has been shown with respect to the case of the two-segment recording type VTR. However, the number of segments is not limited to two. The invention can be also applied to the VTR of the "multi-segment recording" type and to the VTR of the "multi-channel and multi-segment recording" type in which the channel division recording system is also used.

The duration $T_O$ of the additional period and the signal which is interposed in the additional period are not limited to those in the foregoing embodiment. When the signal period of one line upon recording of the video signal is set to $T_l$, $T_O$ is set as follows:

$$T_O = (P+Q) \times T_l + a$$

where P and Q are natural numbers and $0 \leq \alpha < T_l$. The similar effect is obtained in a manner such that the same signal as that in the first $P \times T_l$ period of the next segment in the additional period is interposed in the former half $P \times T_l$ period of the additional period $T_O$, while the same signal as that in the last $Q \times T_l$ period of the preceding segment directly before the additional period is interposed in the latter half $Q \times T_l$ period of the additional period $T_O$. Because the signal in the period of o is not used as the correction signal, the signal which is interposed upon recording of the video signal is not limited.

While the preferred embodiments have been described, it is to be understood that further modifications will be apparent to those skilled in the art without departing from the spirit of the invention. The scope of the invention is therefore to be determined solely by the appended claims.

We claim:

1. A recording apparatus for processing a video signal of one television field for recording on a magnetic recording medium comprising:
    means for separating the video signal of one television field into a plurality of segments, each segment including a plurality of video lines;
    means for detecting a joint portion between adjoining segments;
    means for inserting an additional time period between adjoining segments of the video signal;
    a first means for inserting further signals into the additional time period, wherein said further signals include signals corresponding to signals of at least one video line included in at least one of the segments adjoining the detected joint portion wherein said signals of at least one video line are the signals of a first video line of the segment located immediately after the detected portion; and
    a second means for inserting, into the additional time period, the signal of a last video line of the segment located immediately before the detected joint portion between the inserted signal of the first video line of the segment located immediately after the detected joint portion and the segment located immediately after the detected joint portion.

2. A method for processing a video signal of one television signal for recording on a magnetic recording medium comprising the steps of:
    separating the video signal of one television field into a plurality of segments, each segment including a plurality of video lines;
    detecting a joint portion between adjoining segments;
    inserting an additional time period between adjoining segments;
    inserting further signals into the additional time period, wherein said further signals include signals corresponding to signals of at least one video line included in at least one of the segments adjoining the detected joint portion wherein said signals of at lest one video line are the signals of a first video line of the segment located immediately after the detected joint portion; and
    inserting, into the additional time period, the signal of a last video line of the segment located immediately before the detected joint portion between the inserted signal of the first video line of the segment located immediately after the detected joint portion and the segment located immediately after the detected joint portion.

3. A reproducing apparatus for processing a video signal of one television field previously recorded on a magnetic recording medium, said video signal of one television field being separated into a plurality of segments, each segment including a plurality of video lines, with a joint portion and an additional time period having been inserted in the joint portion between adjoining segments comprising:
    means defining signals inserted into the additional time period wherein said signals include signals of a video line of the segment located immediately before the detected joint portion and signals of a video line of the segment located immediately after the detected joint portion;
    a plurality of means for respectively recovering each segment of the video signal of one television field from the magnetic recording medium, each of the means for recovering including means for reproducing the signal in each respective segment and additional time period joined thereto;
    means for detecting the joint portion; and
    means for switching from one of the means for recovering to another means for recovering upon detection of the joint portion, so that said another means for recovering recovers the same signal as said one of the means for recovering.

* * * * *